UNITED STATES PATENT OFFICE.

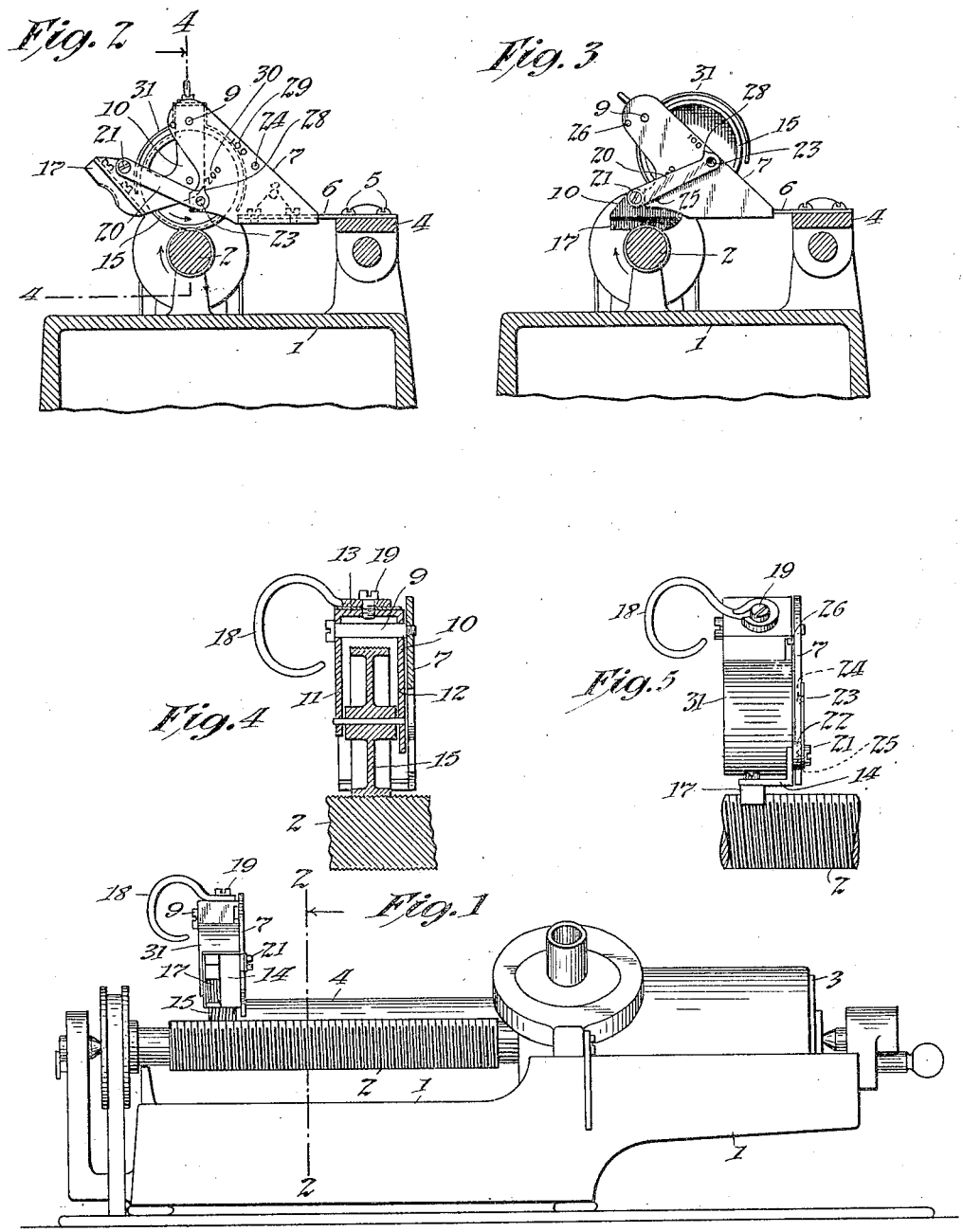

HERMAN WOLKE, OF ORANGE, NEW JERSEY, ASSIGNOR TO NEW JERSEY PATENT COMPANY, OF WEST ORANGE, NEW JERSEY, A CORPORATION OF NEW JERSEY.

PHONOGRAPH.

932,222.      Specification of Letters Patent.      Patented Aug. 24, 1909.

Application filed January 3, 1907. Serial No. 350,648.

*To all whom it may concern:*

Be it known that I, HERMAN WOLKE, a citizen of the United States, residing at Orange, in the county of Essex and State of New Jersey, have invented certain new and useful Improvements in Phonographs, of which the following is a description.

My invention relates to phonographs of the type wherein the reproducer or recorder is carried by a traveling carriage which is fed across the surface of the rotating record so as to cause the stylus to trace upon said surface a spiral path, the progressive movement of the carriage being produced by means of a rotating feed screw. In an application filed concurrently herewith, Serial No. 350,649 I have described and claimed an improved form of feed mechanism adapted to be applied to a phonograph for feeding the movable carriage, by means of which I am able to use a feed screw having, for example, one-hundred threads to the inch and effect a progressive movement of the carriage of only one-half inch for one hundred turns of the feed screw, or one two-hundredth of an inch for one turn.

The object of the present invention is to provide means whereby the movable carriage may be fed at two different rates of speed, as desired, from one and the same feed screw. For instance, with a feed screw having one hundred threads to the inch, the device will permit the carriage to be fed either at the rate of one one-hundredth of an inch or one two-hundredth of an inch for each revolution of the screw, as desired by the user.

With this end in view my invention consists of the features hereinafter described and claimed.

Reference is hereby made to the accompanying drawings, of which—

Figure 1 is a front elevation of a phonograph provided with a feed device embodying my invention; Fig. 2 is a section on line 2—2 of Fig. 1 with the feed device in the proper position for feeding the carriage at the rate of one two-hundredth of an inch per feed screw revolution; Fig. 3 is a section on the same line as Fig. 2, with the feed device in position for feeding the carriage one one-hundredth of an inch per feed screw revolution; Fig. 4 is a section on line 4—4 of Fig. 2, and Fig. 5 is a front elevation showing the parts in the position of Fig. 3.

The phonograph shown is of a well known form and comprises the body 1, rotating feed screw 2, mandrel 3 and movable carriage 4. Secured at one end to the carriage 4 by screws 5 is a flat spring 6 which carries at its forward end a bracket 7 the same being secured thereto in any suitable manner, as by screws 8. This bracket is provided with a horizontal pin or stud 9 and upon the same is pivoted a movable frame 10 which comprises parallel vertical members 11 and 12 connected by the horizontal member 13 and having a horizontal flange 14. The members 11 and 12 are provided with bearings within which is journaled a rotatable screw or threaded wheel 15, the periphery of which is formed with a thread having the same pitch as the thread of the screw 2 and of reverse direction. For example, if the screw 2 is a right-handed screw then the thread of the screw 15 is left handed. The diameter of the wheel 15 is preferably double that of the screw 2 but may be of any diameter greater than the diameter of the said screw depending upon the speed at which it is desired to feed the carriage, as fully set forth in the concurrent application referred to. Secured to the horizontal flange 14 is a nut 17 the thread of which is formed so as to engage the thread of the screw 2, when in the position shown in Fig. 3. The frame 10 is capable of being turned on its pivot 9 so as to occupy either the position of Fig. 2 or that of Fig. 3. In the position of Fig. 3 the nut 17 will be in engagement with the feed screw and the carriage will therefore be fed forward at the rate of one one-hundredth of an inch for each revolution of the said screw; when the frame occupies the position of Fig. 2 the threaded wheel 15 will be in engagement with the feed screw, and the carriage will be fed forward at the rate of one two-hundredth of an inch for each revolution of the feed screw. For convenience in shifting the frame 10 from one position to the other a curved wire 18 is secured to the same by screw 19 and serves as a finger piece. A flat spring 20 is secured at one end to the frame 10 by a screw 21 threaded in the boss 22, the spring being held between the boss and the head of the screw. The outer end of the spring is formed with a projection 23 which is adapted to engage the sockets or depressions 24 and 25 formed in the face of the bracket 7. The movement of the frame 10 in one direction is limited by the engagement of the vertical member 12 with a pin 21 carried by the bracket 7. In this position the wheel 15 is in engagement with the feed screw 2 and the projection 23 of the spring 20 is in the socket 25, thus locking the frame 10 in position. The movement of the frame 10 in the opposite direction is limited by the engagement of the boss 22 with the forward edge of the bracket 7 and in this position the feed nut 17 will be in engagement with the feed screw 2 and the projection 23 will occupy the socket 24 and lock the frame in this position. The spring 20 is provided with an index finger 28 and the bracket 7 is provided with indicia 29 and 30 which cooperate with said index finger to indicate the speed at which the carriage will be fed. For instance, when the nut 17 is in engagement with the feed screw, the index finger 28 will be opposite the figures 100, thus indicating that the carriage will be fed one inch for each one hundred revolutions of the feed screw; when the index finger is opposite the figures 200 the threaded wheel 15 will be in engagement with the feed screw 2 and the device will indicate that the carriage will be fed forward one inch for every two hundred revolutions of the feed screw. The supporting spring 6 is so applied and the parts are so arranged that there will be a downward pressure of either the wheel 15 or nut 17 upon the feed screw 2 when in operative position, thus securing proper engagement between these two parts. A guard 31 is preferably secured to the frame 10 as by the screw 19 so as to inclose the threaded wheel 15 in order to protect the same.

Having now described my invention, what I claim as new and desire to secure by Letters Patent, is as follows:

1. In a phonograph, the combination of a feed screw, the threads whereof are all of substantially the same pitch, a movable carriage, and a plurality of means carried by said carriage each adapted for feeding the carriage at a different rate of speed by engagement with said feed screw, substantially as set forth.

2. In a phonograph, the combination of a feed screw, a movable carriage, and operatively connected interchangeable means carried upon said carriage for engagement with said feed screw, substantially as set forth.

3. In a phonograph, the combination of a feed screw, a movable carriage, connected interchangeable means upon said carriage for engagement with said feed screw, said interchangeable means being so mounted that as one approaches the feed screw the other recedes therefrom, substantially as set forth.

4. In a phonograph, the combination of a feed screw, a movable carriage, a plurality of connected means pivotally attached to the said carriage for engagement with said feed screw, and means for moving either one thereof into said engagement for feeding the carriage at different rates of speed, substantially as set forth.

5. In a phonograph, the combination of a feed screw, a movable carriage, a frame on said carriage, said frame being provided with a feed nut and a rotary wheel and being movable so as to bring either the nut or the wheel into engagement with the feed screw, substantially as set forth.

6. In a phonograph, the combination of a feed screw, a movable carriage, a feed nut, and a wheel provided with means for operatively engaging the feed screw, the said nut and wheel being movable with respect to the carriage so that either one may be brought into engagement with the feed screw, substantially as set forth.

7. In a phonograph, the combination of a feed screw, a movable carriage, a frame connected thereto by a pivot and provided with a feed nut and a rotary wheel so arranged that either may be brought into proper position for engagement with the feed screw when the frame is moved on its pivot, substantially as set forth.

8. In a phonograph, the combination with a feed screw, a movable carriage, and a frame connected to said carriage by a pivot, of a feed nut and rotary wheel carried by said frame in such position as to be brought into engagement with the feed screw when the frame is moved on its pivot, and an index finger secured to said frame for indicating the rate of feed of said carriage, substantially as set forth.

9. In a phonograph, the combination of the feed screw, movable carriage and frame carried by the carriage, said frame being provided with a feed nut and a rotary threaded wheel and being movable so as to bring either the nut or threaded wheel into engagement with the feed screw, substantially as set forth.

10. In a phonograph, the combination of the feed screw, movable carriage and frame connected thereto by a horizontal pivot, and provided with a feed nut and a rotary threaded wheel so arranged as to be brought into proper position for engagement with the feed screw when the frame is moved on its pivot, substantially as set forth.

11. In a phonograph, the combination of the feed screw, movable carriage and spring supported frame carried by the carriage, said frame being provided with a feed nut and a rotary threaded wheel and being movable so as to bring either the nut or threaded wheel into engagement with the feed screw, substantially as set forth.

12. In a phonograph, the combination of the feed screw, movable carriage, a flat spring secured at one end to the carriage and a frame secured to the free end of the spring, said frame being provided with a feed nut and a rotary threaded wheel and being movable so as to bring either the nut or threaded wheel into engagement with the feed screw, substantially as set forth.

13. In a phonograph, the combination of the feed screw, movable carriage, a frame carried by said carriage, said frame being provided with a feed nut and a rotary threaded wheel, and being movable so as to bring either the nut or threaded wheel into engagement with said feed screw, and means for locking said frame in either of its operative positions, substantially as set forth.

14. In a phonograph, the combination of the feed screw, movable carriage, a frame carried by said carriage, said frame being provided with a feed nut and a rotary threaded wheel, and being movable so as to bring either the nut or threaded wheel into engagement with said feed screw, and means for limiting the movement of said frame in each direction beyond its operative position, substantially as set forth.

15. In a phonograph, the combination of the feed screw, movable carriage and interchangeable means carried by the carriage for engagement with said feed screw for feeding the carriage at different rates of speed, and an indicator movable with said interchangeable means for indicating the rate of feed of the carriage, substantially as set forth.

16. In a phonograph, the combination with the feed screw, movable carriage and frame connected to said carriage by a horizontal pivot, of a feed nut and rotary threaded wheel carried by said frame in such positions as to be brought into engagement with the feed screw as the frame is moved on its pivot, and an index finger secured to said movable frame and coöperating with relatively fixed indicia for indicating the rate of feed of said carriage, substantially as set forth.

This specification signed and witnessed this 22nd day of Decr., 1906.

HERMAN WOLKE.

Witnesses:
FRANK L. DYER,
FRANK D. LEWIS.